(12) United States Patent
Fedorov

(10) Patent No.: US 7,826,464 B2
(45) Date of Patent: Nov. 2, 2010

(54) COMMUNICATION SYSTEM

(76) Inventor: Mikhail Fedorov, 2784 Imperial Valley Trail, Aurora, IL (US) 60503-5606

( * ) Notice: Subject to any disclaimer, the term of this patent is extended or adjusted under 35 U.S.C. 154(b) by 716 days.

(21) Appl. No.: 11/651,644

(22) Filed: Jan. 10, 2007

(65) Prior Publication Data
US 2008/0165788 A1 Jul. 10, 2008

(51) Int. Cl.
H04L 12/56 (2006.01)

(52) U.S. Cl. .................. 370/401; 382/115

(58) Field of Classification Search .......... 725/34; 454/184
See application file for complete search history.

(56) References Cited

U.S. PATENT DOCUMENTS

| | | | |
|---|---|---|---|
| 5,031,228 A | 7/1991 | Lu | |
| 5,060,278 A | 10/1991 | Fukumizu | |
| 5,252,951 A | 10/1993 | Tannenbaum et al. | |
| 5,621,818 A | 4/1997 | Tashiro | |
| 5,668,929 A | 9/1997 | Foster, Jr. | |
| 6,058,304 A | 5/2000 | Callaghan et al. | |
| 6,185,337 B1 | 2/2001 | Tsujino et al. | |
| 6,304,851 B1 * | 10/2001 | Kmack et al. | 705/11 |
| 6,332,139 B1 | 12/2001 | Kaneko et al. | |
| 6,421,453 B1 * | 7/2002 | Kanevsky et al. | 382/115 |
| 6,611,881 B1 * | 8/2003 | Gottfurcht et al. | 710/18 |
| 6,615,213 B1 * | 9/2003 | Johnson | 707/10 |
| 6,738,513 B1 | 5/2004 | Binnig et al. | |
| 6,760,916 B2 * | 7/2004 | Holtz et al. | 725/34 |
| 6,820,204 B1 * | 11/2004 | Desai et al. | 726/6 |
| 6,963,937 B1 * | 11/2005 | Kamper et al. | 710/73 |
| 7,024,256 B2 * | 4/2006 | Krzyzanowski et al. | 700/65 |
| 7,098,392 B2 | 8/2006 | Sitrick et al. | |
| 7,110,573 B2 | 9/2006 | Monk et al. | |
| 7,149,699 B2 * | 12/2006 | Barnard et al. | 705/7 |
| 7,272,662 B2 * | 9/2007 | Chesnais et al. | 709/246 |
| 7,305,360 B1 * | 12/2007 | Lamoureux et al. | 705/34 |
| 7,379,978 B2 * | 5/2008 | Anderson et al. | 709/219 |
| 7,543,232 B2 * | 6/2009 | Easton et al. | 715/708 |
| 7,554,522 B2 * | 6/2009 | Sinclair et al. | 345/156 |
| 2002/0059588 A1 * | 5/2002 | Huber et al. | 725/35 |
| 2002/0087894 A1 * | 7/2002 | Foley et al. | 713/202 |
| 2002/0152001 A1 * | 10/2002 | Knipp et al. | 700/100 |
| 2004/0072534 A1 * | 4/2004 | Wiley | 454/184 |
| 2004/0198386 A1 * | 10/2004 | Dupray | 455/456.1 |
| 2005/0280555 A1 * | 12/2005 | Warner | 340/932.2 |
| 2007/0192277 A1 * | 8/2007 | Jackson | 707/1 |
| 2008/0182644 A1 * | 7/2008 | Lutnick et al. | 463/20 |

* cited by examiner

Primary Examiner—Thong H Vu
(74) Attorney, Agent, or Firm—P. Jeff Martin; The McGougan Law Firm, LLC

(57) ABSTRACT

An identification, verification, and response communication system which functions as a household or business wall information center adapted to recognize homeowners and/or residents, or business owners and/or employees using a detection means. The communication system includes a user profile interface defining customized data and information according to a specific homeowner's and/or resident's, or business owner's and/or employees' needs.

23 Claims, 3 Drawing Sheets

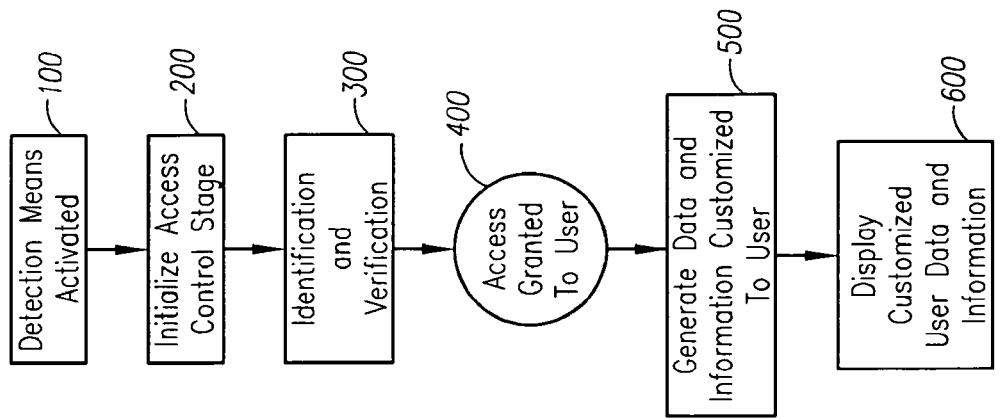
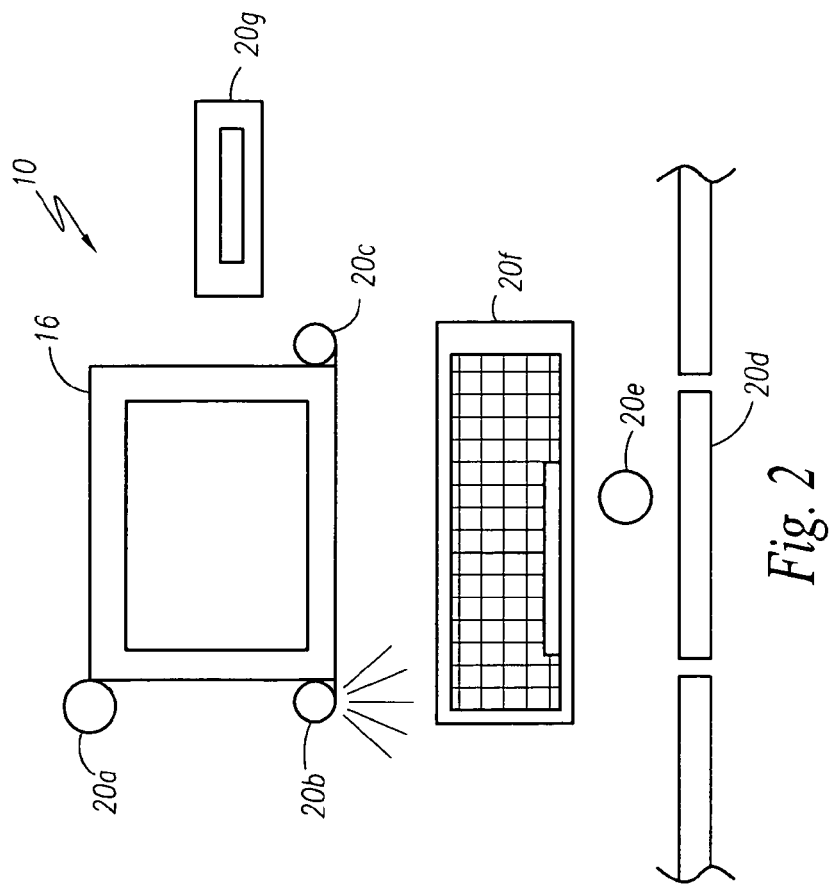

COMMUNICATION SYSTEM

RELATED APPLICATIONS

The present invention was first described in Disclosure Document No. 607,120 filed on Oct. 6, 2006 under 35 U.S.C. §122, 37 C.F.R. §1.14, and MPEP §1706. It is respectfully requested that said Disclosure Document remain a permanent part of the file history of the present application and be relied upon during the pending prosecution, and for any other matters that may arise concerning said present application and the subject matter contained therein. There are no previously filed, nor currently any co-pending applications, anywhere in the world.

BACKGROUND OF THE INVENTION

1. Field of the Invention

The present invention relates generally to information communication systems and, more particularly, to an information-identification, verification, and response communication system.

2. Description of the Related Art

The prior art teaches various information communication systems, and more particularly image, visualization, pattern, document, and speech recognition and verification systems and methodologies. However, the prior art fails to teach an information-identification, verification, and response communication system which is suitably housed within a casing adapted for vertical surface mounting and which initiates a sequence to identify and then confirm or deny the potential user's request, thereby allowing or preventing interaction with the system via a plurality of customized options and commands.

Accordingly, a need has arisen for an information-identification, verification, and response communication system which functions as a household or business wall information center adapted to recognize homeowners and/or residents, or business owners and/or employees, and display data and information or be customized with data and information according to a specific homeowner's and/or resident's, or business owner's and/or employees' needs and requiring minimum effort to receive and access information. A need has also arisen for such communication system to be further adapted with response logic to address visitors in a manner which is quick, easy, and efficient. The development of communication system fulfills this need.

A search of the prior art did not disclose any patents that read directly on the claims of the instant invention; however, the following references were considered related.

The following patents disclose various information communication systems, and more particularly image, visualization, pattern, document, and speech recognition and verification systems and methodologies:

U.S. Pat. No. 6,332,139 B1, issued in the name of Kaneko et al.;

U.S. Pat. No. 6,058,304, issued in the name of Callaghan et al.;

U.S. Pat. No. 7,110,573 B2, issued in the name of Monk et al.;

U.S. Pat. No. 6,185,337 B1, issued in the name of Tsujino et al.

U.S. Pat. No. 5,668,929, issued in the name of Foster, Jr.;

U.S. Pat. No. 5,031,228, issued in the name of Lu;

U.S. Pat. No. 5,060,278, issued in the name of Fukumizu;

U.S. Pat. No. 5,621,818, issued in the name of Tashiro;

U.S. Pat. No. 6,738,513 B1, issued in the name of Binnig et al.;

U.S. Pat. No. 7,098,392 B2, issued in the name of Sitrick et al.; and

U.S. Pat. No. 5,252,951, issued in the name of Tannenbaum et al.

Consequently, a need has been felt for an information-identification, verification, and response communication system which functions as a household or business wall information center adapted to recognize homeowners and/or residents, or business owners and/or employees, wherein such system is customized with data and information according to a specific homeowner's and/or resident's, or business owner's and/or employees' needs. A need has also arisen for such communication system to be further adapted with response logic to address visitors in a manner which is quick, easy, and efficient.

SUMMARY OF THE INVENTION

Therefore, it is an object of the present invention to provide an information-identification, verification, and response communication system housed within a casing adapted for vertical surface mounting.

It is another object of the present invention to provide a communication system which includes a central processing unit and storage device.

It is another object of the present invention to provide a video display monitor operatively coupled to the central processing unit and the storage device.

It is another object of the present invention to provide a means for detecting the presence of a user.

It is another object of the present invention to provide a detection means adapted to immediately grant access to user or initialize an access control prompt upon detection of a potential user.

It is another object of the present invention to provide an access control prompt which comprises a defined time window for receipt of access control information, with the access control prompt terminating if access control information is not input within the defined time window.

It is another object of the present invention to provide a communication system adapted with information acquisition capability to suit the particular desires of a registered or unregistered user.

It is still another object of the present invention to provide a means for supplying power to the communication system.

It is yet another object of the present invention to provide an access control stage allowing a potential user to gain access to the communication system, whereupon the identified and verified user is able to view information customized for such user, or where the identified and verified user is able to view user-customized information and to search through a plurality of options and data as desired.

Briefly described according to one aspect of the present invention, a communication system is disclosed and is comprised of electronics and computing technology housed within a casing adapted for vertical surface mounting. The system comprises a central processing unit and storage device, the central processing unit and the storage device operatively coupled to one another; a video display monitor operatively coupled to the central processing unit and the storage device; means for detecting the presence of a user, detection means operatively coupled to the central processing unit and the storage device; means for recalling and interacting with the central processing unit when system is engaged by the user and/or means for inputting at least one command by the user, wherein recall and interaction means and/or input means operatively coupled to the central processing unit and the storage device, and wherein the central processing unit and the video display responsive to recall and interaction means and/or input means; and means for supplying power to the system.

The detection means initializes an access control prompt upon detection of a potential user or immediately grants access to user in the event user is identified and verified, thereby allowing for user interaction with system. The access control prompt comprises a defined time window for receipt of access control information, with the access control prompt terminating if access control information is not input within the defined time window.

In one embodiment, the detection means comprises a video camera operatively coupled to the system, the video camera initializing an access control prompt upon detection of a human presence in the video frame.

In another embodiment, the detection means comprises a motion detector operatively coupled to the system, the motion detector initializing an access control prompt upon detection of movement within a defined area and within defined parameters.

In another embodiment, the detection means comprises an audible detector operatively coupled to the system, the audible detector initializing an access control prompt upon detection of audible movement within a defined area and within defined parameters. The audible detector may comprise a voice recognition unit, wherein the voice recognition unit comprises predefined voice patterns of acceptable users stored in the storage device. In another embodiment, the audible detector may comprise a noise recognition unit, the noise recognition unit comprising predefined inputs of acceptable noises capable of initializing the access control prompt.

In another embodiment, the detection means comprises a pressure sensitive detector operatively coupled to the system, the pressure sensitive detector initializing an access control prompt upon detection of audible movement within a defined area and within defined parameters.

In another embodiment, the detection means comprises a manual input of a user's presence, the manual input comprising the actuation of at least one key or button operatively coupled to the system for initializing an access control prompt.

In another embodiment, the detection means comprises a biometric identification and verification system. The biometric identification and verification system may comprise scanning a measurable characteristic of a living being. Alternatively, or additionally, the biometric identification and verification system comprises a signature recognition unit. Alternatively, and/or additionally, the biometric identification and verification system comprises a keystroke recognition unit. Alternatively, and/or additionally, the biometric identification and verification system comprises a deoxyribonucleic acid (DNA) recognition unit.

In one embodiment, the input means comprises a key pad having alphanumeric keys.

In another embodiment, the video display monitor comprises input means, wherein input means comprises an interactive touchscreen component.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a front view of one possible configuration of the system as would be encountered at the entrance of a building or dwelling;

FIG. 3 is a block diagram of the method of the system described below; and

DESCRIPTION OF THE PREFERRED EMBODIMENT

1. Detailed Description of the Figures

Figure 1:
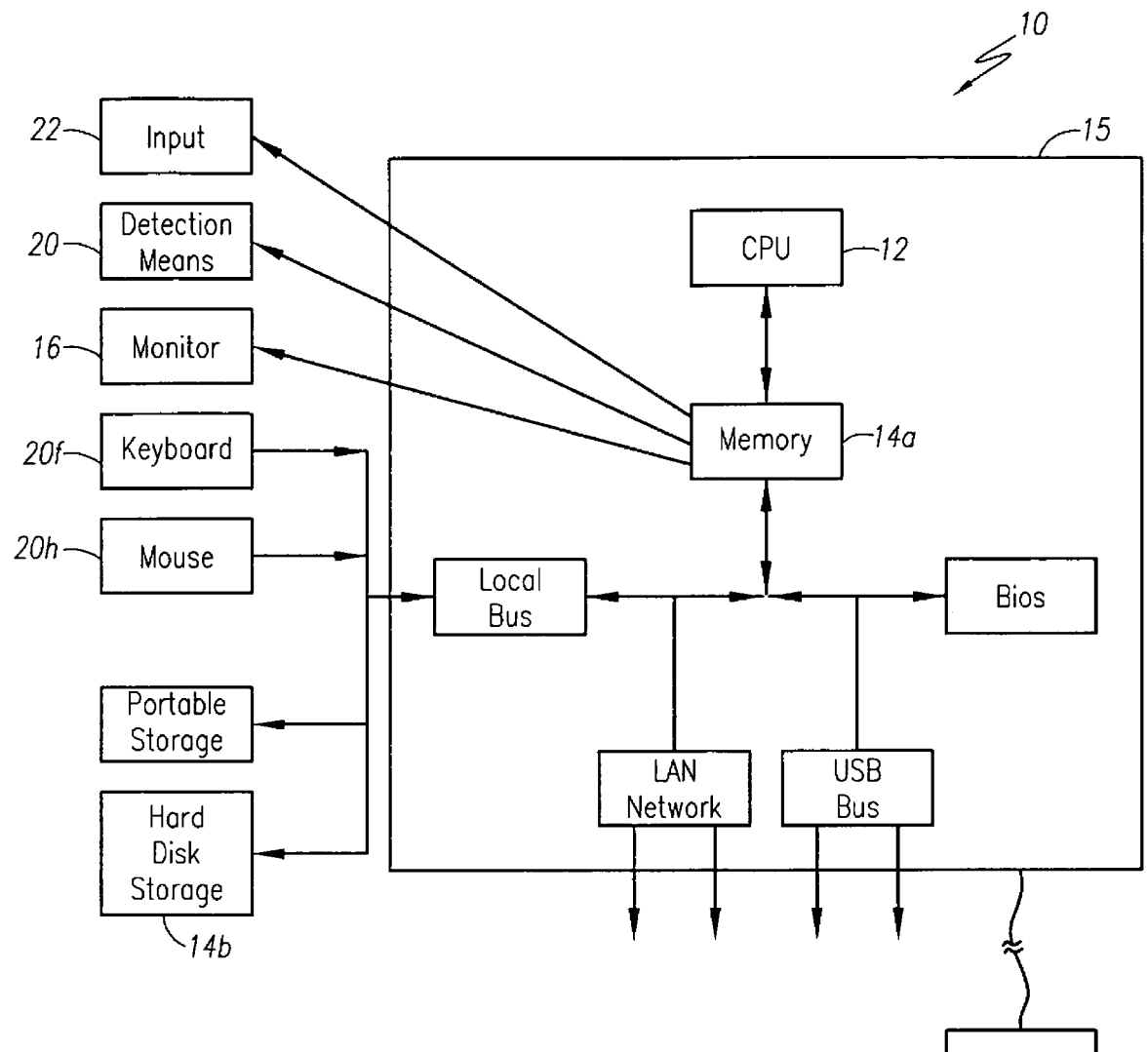
FIG. 1 is a schematic of one possible configuration of the system as described in the description below.

Referring now to FIG. 1 through FIG. 4, an interactive communication system 10 for a home, apartment or business exchanging information between the user and the system is disclosed in accordance with at least one embodiment of the present invention. The system 10 is comprised of electronics and computing technology housed within a casing 15 adapted for vertical surface mounting. The system 10 is envisioned as being installed or mounted in-premises in high-traffic areas such as a hall or a kitchen of a dwelling or structure or installed or mounted outer-premises of a dwelling or structure. The system 10 comprises a central processing unit (CPU) 12 operatively coupled to a memory 14a, and a storage device(s) 14b, such as a hard disk, with the CPU 12 and storage device 14b operatively coupled to a video display monitor 16. The base program utilized to operate the system 10 is installed onto the storage device 14b for recall and interaction with the CPU 12 when the system 10 is engaged by a user. The system 10 includes means 18 for supplying power, such as an electrical plug-in, a battery or series of batteries, or some other suitable means for providing the electrical input required to power and operate the system 10.

The system 10 includes means 20 for detecting the presence of a potential user. Detecting or detection means 20 may include a video camera 20a, a motion sensor or detector 20b (such as infrared), an audio component 20c (such as a microphone), a pressure sensitive pad or element 20d where the potential user might stand or depress, a heat sensor or detector 20e, or a special command input by the potential user utilizing a keyboard or keypad 20f, a mouse 20h, biometric methods and/or apparatuses 20g, or a combination of two or more of the specific methods and components described. Other similar devices and apparatuses are envisioned as equally suitable as a substitute for the devices and apparatuses denoted above. Upon detection of a potential user, the system 10 initiates a sequence to identify and then confirm or deny the potential user's request to interact with the system 10. The sequence may comprise a requirement for user identification and password combination via video camera recognition, biometric recognition application(s), or other common and suitable substitutes presently known and used in the art.

With regard to biometric methods, apparatuses and the recognition applications, it is envisioned that any of the following applications may be included in the present device, separately or in combination: fingerprint, iris and/or retinal scanning, face and/or hand recognition, signature recognition, keystroke recognition, voice recognition, and/or DNA recognition, among other developing technologies. Such a sequence may be generally denoted as "access control" to describe the first stage of a potential user for gaining access to the system 10. It is envisioned that the access control stage will include a program or means for detecting one or more potential users in the area of interaction, so that if a recognized user is forcibly required to attempt access and/or entry into the dwelling or structure, the system 10 will detect the unauthorized user and would prompt an automatic alert to an off-site security company and/or alert local law enforcement authorities, including either silent alarms and/or audible alarms (as may be desired or necessary).

After successfully navigating the access control stage, the identified and verified user will then be able to search through a plurality of options and data as desired. One such option may include gaining access that permits ingress and egress through the entrance, or through another entrance that may be selected, including keyless entry of such entrances. It is envisioned that a multitude of data may be immediately displayed via video display monitor 16 upon user identification and verification. It is further envisioned that a multitude of data may be available at the request of the user, including such data as: the identity of persons that may have entered and exited the structure during a defined period of time, such as a visitation log; the identity of persons that may be presently within the structure; internal and/or external surveillance equipment for scanning the internal and external areas of the property; alerts and/or recordings of any persons or parties attempting to gain access to the property and/or the system 10; utility(ies) consumption (such as water, gas and/or electricity, whereby any leaks or unusual activity(ies) may be an alert that a leak exists), and/or the internal temperature of the structure; any phone, text or email messages of a high priority, including identification of the sender, date and time, and content of the message(s); and, a calendar or organizer, including reminders for activities and/or chores. It is envisioned that the system 10 may be capable of integrating the personal or business computer of a user or users (as desired) to incorporate the calendar and/or organizer component into the system 10. It is further envisioned that the system 10 may be capable of integrating the phone, text and/or email messages from the respective carriers via software or other means for achieving interoperability between the carrier and the system 10.

The system 10 is capable and may be configured to allow multiple users to interact with the system 10, including all employees (in a business) or all occupants of a dwelling (such as a house or apartment). As such, multiple profiles may be created and customized to provide the appropriate information and/or prompts to the respective profile user. For instance, in a family of four, with a father, mother, son and daughter, the father and mother may have profiles configured and customized to provide information and data concerning the identity of visitors to the dwelling, including any deliveries that may have been attempted or completed, while the son and daughter may have a profile that merely allows the son and/or daughter to interact with the system 10 and/or gain entry into the dwelling. Likewise, the profiles may be customized so that if the son and/or daughter arrive at the dwelling before the parents, the system 10 may generate a series of prompts requiring answers so that the child or children are alerted to specific data that would normally be monitored by the parent(s), but for the moment the parents need the child (ren) to be aware.

In one embodiment of the present invention, and as but one example of the possibilities that may be utilized, the system 10 is depicted as comprising a video display monitor 16 installed or mounted in-premises of a dwelling or structure in high-traffic areas thereof such as a hall or a kitchen, or installed or mounted outer-premises of a dwelling or structure such as the entrance of a home or business, the monitor 16 operatively coupled and interacting with a CPU 12, storage device 14*b* and any hardware and software components necessary to operate the system 10, and having a power source 18 for providing the electricity to operate the devices within the system 10. When a potential user approaches the monitor 16, the sensor(s) or detector(s) 20 utilized within the system 10 begin(s) the identification and verification process in accordance with the particulars of the sensor(s) and/or detector(s) 20, whether the sensing or detecting means 20 comprises video 20*a*, audio 20*c*, touch sensitive 20*d*, and/or biometric means 20*g* for beginning the access control stage. After the potential user has successfully entered or provided the necessary information, and the system 10 has identified and verified the user's identity as a profile with permission to use the system 10, the system 10 will generate a customized interface displayed on the video display monitor 16 for the identified and verified user to be able to view information customized for such user or to review and provide customized options and commands that the user may select.

The system 10 comprises at least one of the detecting means 20 described above, such as visual recognition, motion sensitive recognition, biometric specific recognition, or requiring affirmative command recognition through manual input of the potential user's assigned user name and password. The levels or layers of access control stage security may be customized to suit the particular desires of the user(s), and is controlled by some form of manual or automated input command 22. For instance, if visual recognition via a video camera or motion detecting or sensing recognition via infrared initializes the access control stage, then the user(s) may wish to have a heightened layer(s) of security so that the potential user may be required to input user identification, password or code, and possibly additional information. Conversely, if a biometric recognition control is utilized, either separately or in combination, the specificity of the biometric information that is generally unique to individuals may require no additional or minimally additional layering of security by the potential user.

The system 10 may be customized to provide minimal, but convenient, interaction with the unit by couriers, carriers or scheduled visitors or guests. For instance, with regard to a business, a postal mail carrier or a parcel carrier (or multiple carriers) may be provided with a user profile that permits limited access to complete deliveries of mail or parcels to the business. It is also envisioned that other regular visitors to a business, such as a supplier, may also have similar limited user profile identities and clearances without compromising the intended security of the system 10. The system 10 is envisioned as adaptable for limited use profile identities, such as required maintenance service delivered by plumbers, electricians or other similar service personnel. In such an embodiment, the service personnel would have an identity and be provided with codes or instructions for satisfying access control, but would be limited to a particular time window, purpose and possibly require a physical escort or be required to report to the system 10 or to appropriate personnel for periodic input into the system 10.

It is also envisioned that the system 10 may be programmable to provide specific instructions for such limited purpose users. For instance, if a parcel carrier wishes to deliver a parcel to a business or residence, the system 10 may be programmed to deliver a message or prompt to leave or place the parcel at a particular location, or to contact a particular person responsible for receipt of such items. It is also envisioned that the system 10 may be interoperable and interconnected with a remote user or users, so that an unexpected visit or delivery may be handled promptly.

Generally, the method of accessing the system 10 may be described in accordance with the representation depicted in FIG. 3, in which the potential user is detected by the detection means 20 at 100, wherein the detection means 20 initializes the access control sequence at 200. The system 10 identifies and verifies user at 300, whereupon system 10 immediately grants access to user at 400, thereby allowing for user interaction with system 10. System 10 generates relevant data and information being customized to verified user at 500, and immediately displays such data and information via video display monitor 16 at 600.

Figure 4:
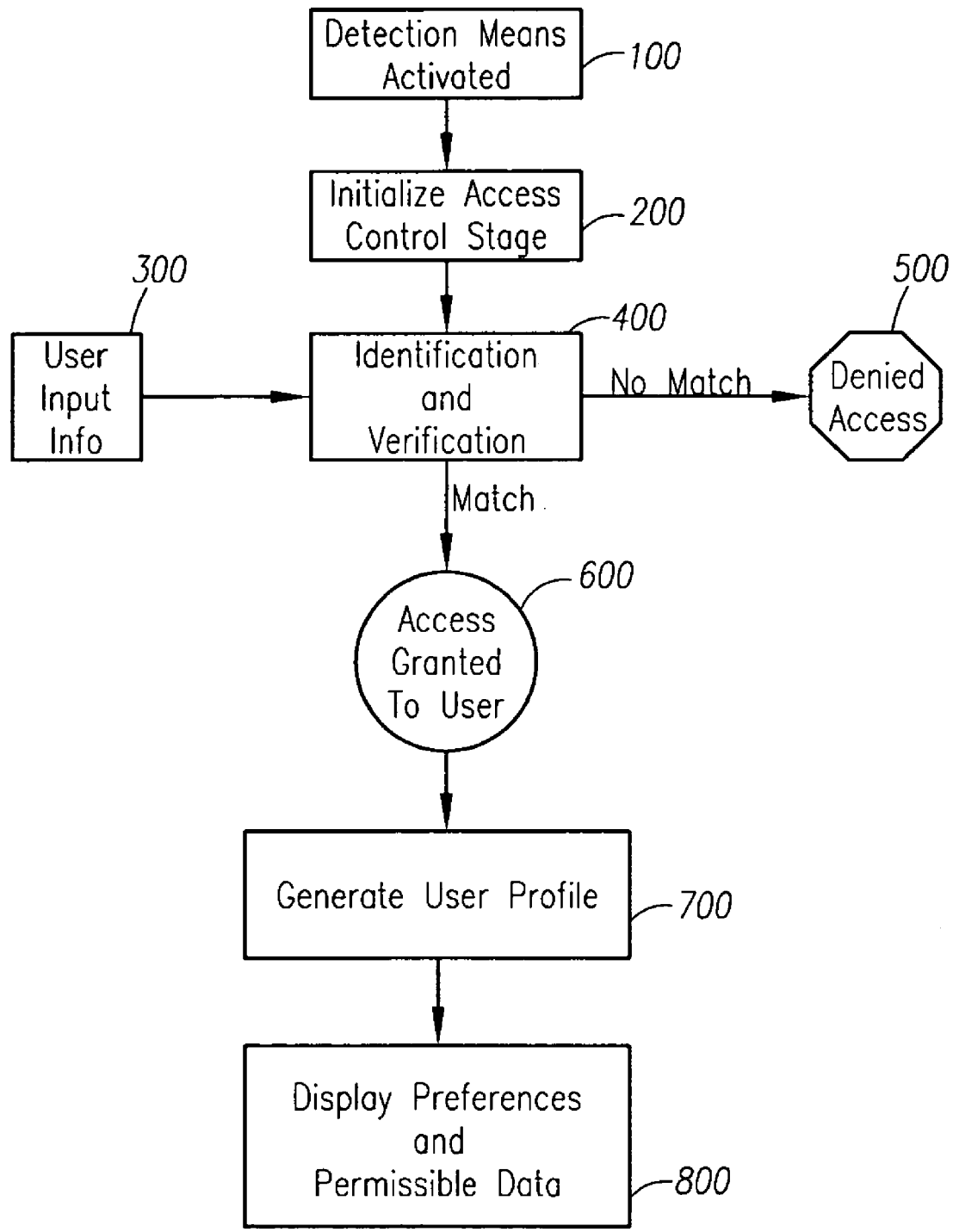
FIG. 4 is a block diagram of an alternate method of the system described below.

Generally, an alternative method of accessing the system 10 may be described in accordance with the representation depicted in FIG. 4, in which the potential user is detected by the detection means 20 at 100, wherein the detection means 20 initializes the access control sequence at 200. The potential user will input the required or requested information at 300, and the system 10 will identify and then verify the information and compare the input information with the user profiles programmed into the system, this occurring at 400. If the potential user's information does not match any user profile, the potential user will be denied access, at 500. The system 10 may be programmed to provide a set limit of opportunities for the user to access the system 10. If the potential user's information is matched to a user profile, the user will gain access at 600. The system 10 will then generate the user's matching profile at 700. And, the system 10 will then display the user's preferences (if any) and any permissible data or areas of attention at 800.

2. Operation of the Preferred Embodiment

To use the present invention, upon being detected by the detection means 20, system 10 identifies and verifies user, whereupon system 10 immediately grants access to user, thereby allowing for user interaction with system 10. System 10 generates relevant data and information being customized to verified user, and immediately displays such data and information via video display monitor 16.

The present invention is also envisioned as being operable in the manner described hereinbelow. To use the present invention, upon being detected by the detection means 20, user inputs the required or requested information presented by the system 10. The system 10 then identifies and verifies information input by user and compares the input information with user's profile which is programmed into the system 10. If the potential user's input information fails to match any user profile, the potential user will be denied access to further system 10 application. The system 10 may be programmed to provide a set limit of opportunities for the user to access the system 10. If the potential user's information is matched to a user profile, user gains access, thereby facilitating the generation by system 10 of the user's matching profile. And, the system 10 will then display the user's preferences (if any) and any permissible data or areas of attention.

The use of the present invention provides an information-identification, verification, and response communication system which functions as a household or business wall information center adapted to recognize homeowners and/or residents, or business owners and/or employees, wherein such system is customized with data and information according to a specific homeowner's and/or resident's, or business owner's and/or employees' needs. The use of present invention further provides a communication system adapted with response logic to address visitors in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A communication system comprising:
    a casing adapted for housing the communication system, the casing being further adapted for vertical surface mounting, and wherein the communication system further comprises:
    a central processing unit, memory and a storage device, the central processing unit, memory and the storage device coupled to communicate with one another;
    a video display monitor coupled to the memory;
    means for detecting the presence of a user, the detection means coupled to the memory;
    means for identifying and verifying user's identity as a customized profile;
    means for generating a customized interface displayed on the video display monitor for an identified and verified user, thereby allowing the identified and verified user to view information being customized for the identified and verified user or to allow the identified and verified user to review customized options and commands being selectable by the identified and verified user; and
    means for supplying power to the system.

2. A communication system comprising:
    a casing adapted for housing the communication system, the casing being further adapted for vertical surface mounting, and wherein the communication system further comprises:
    a central processing unit, memory and a storage device, the central processing unit, memory and the storage device coupled to communicate with one another;
    a video display monitor coupled to the memory;
    means for detecting the presence of a user, the detection means coupled to the memory;
    means for inputting at least one command by the user, the input means coupled to the memory, and wherein the memory and the central processing unit and the video display responsive to the input means; and
    means for supplying power to the system.

3. The system of claim 2, wherein detection means initializes an access control prompt upon detection of a potential user.

4. The system of claim 3, wherein the access control prompt comprises a defined time window for receipt of access control information, the access control prompt terminating if access control information is not input within the defined time window.

5. The system of claim 2, wherein detection means comprises a video camera coupled to the system, the video camera initializing an access control prompt upon detection of a human presence in the video frame.

6. The system of claim 2, wherein detection means comprises a motion detector coupled to the system, the motion detector initializing an access control prompt upon detection of movement within a defined area and within defined parameters.

7. The system of claim 2, wherein the detection means comprises an audible detector coupled to the system, the audible detector initializing an access control prompt upon detection of audible movement within a defined area and within defined parameters.

8. The system of claim 7, wherein the audible detector comprises a voice recognition unit.

9. The system of claim 8, wherein the voice recognition unit comprises predefined voice patterns of acceptable users stored in the storage device.

10. The system of claim 8, wherein the audible detector comprises a noise recognition unit, the noise recognition unit comprising predefined inputs of acceptable noises capable of initializing the access control prompt.

11. The system of claim 2, wherein the detection means comprises a pressure sensitive detector coupled to the system, the pressure sensitive detector initializing an access control prompt upon detection of audible movement within a defined area and within defined parameters.

12. The system of claim 2, wherein the detection means comprises a manual input of a user's presence, the manual input comprising the actuation of at least one key or button coupled to the system for initializing an access control prompt.

13. The system of claim 2, wherein the detection means comprises a biometric identification and verification system.

14. The system of claim 13, wherein the biometric identification and verification system comprises a means for scanning a measurable characteristic of a living being.

15. The system of claim 13, wherein the biometric identification and verification system comprises a signature recognition unit.

16. The system of claim 13, wherein the biometric identification and verification system comprises a keystroke recognition unit.

17. The system of claim 13, wherein the biometric identification and verification system comprises a DNA recognition unit.

18. The system of claim 2, wherein the input means comprises a key pad having alphanumeric keys.

19. The system of claim 2, wherein the input means comprises a biometric identification and verification system.

20. The system of claim 2, wherein the video display monitor comprises an input means, wherein the input means comprises an interactive touchscreen component.

21. The system of claim 2, further comprising means for generating a customized interface displayed on the video display monitor for an identified and verified user so as to allow the identified and verified user to review the access control information or customized options and commands being selectable by the identified and verified user.

22. A method of accessing a communication system comprising:
   initializing an access control sequence via a detection means;
   identifying and verifying a user,
   granting immediate access to the user of the system, thereby allowing for user interaction with the system; and
   generating relevant data and information being customized to an identified and verified user; and
   displaying immediately customized data and information via a video display monitor.

23. A method of accessing a communication system comprising;
   initializing an access control sequence via a detection means;
   inputting required or requested information;
   identifying and verifying required or requested information;
   comparing input information with user profiles programmed into the system;
   denying access to a potential user if the input information does not match any user profile, or granting access to the potential user if the input information is matched to a user profile, thereby actuating the system to generate a matching profile of the potential user; and
   displaying the potential user's preferences and any permissible data or areas of attention where access to the system is granted to the potential user.

* * * * *